United States Patent

[11] 3,597,086

| [72] | Inventors | Martti Juhani Mela<br>Box 13067, Helsinki 13;<br>Martti Seppo Sulonen, Lielahdentie 2A21,<br>Helsinki 20, both of, Finland |
|---|---|---|
| [21] | Appl. No. | 845,437 |
| [22] | Filed | July 28, 1969 |
| [45] | Patented | Aug. 3, 1971 |
| [32] | Priority | Aug. 8, 1968 |
| [33] | | Finland |
| [31] | | 2250/68 |

[54] METHOD AND APPARATUS FOR LASER MICROANALYSIS
7 Claims, 5 Drawing Figs.

| [52] | U.S. Cl. | 356/86 |
|---|---|---|
| [51] | Int. Cl. | G01j 3/30 |
| [50] | Field of Search | 356/85, 87 |

[56] References Cited
OTHER REFERENCES
" Q-Switched Ruby Laser for Emission Microspectroscopic Elemental Analysis"; Peppers et al.; Analytical Chemistry Vol. 40 #8 July 1968; pg. 1178−1182.

*Primary Examiner*—Ronald L. Wibert
*Assistant Examiner*—V. P. McGraw
*Attorney*—Lane, Aitken, Dunner and Ziems

ABSTRACT: Apparatus for spectrographic analysis. The apparatus includes a laser light generator for producing a stream of laser light, which stream is focused by laser focusing optics on one side of a thin foil sample to be analyzed. Located on the side of the foil opposite the side upon which the laser light is focused are electrodes which can be utilized to assist ionization of the foil sample. Optics for collecting the resulting radiation from the plasma of the sample and directing such radiation to a spectroscope are positioned between the side of the foil facing the electrodes and the spectroscope. Method of utilizing such apparatus including maintaining the thickness of the foil sample so that the stream of laser light focused thereon penetrates the foil.

PATENTED AUG 3 1971          3,597,086

INVENTORS
MARTTI J. MELA &
MARTTI S. SULONEN

BY
*Lane, Aitken, Dunner & Ziems*
ATTORNEYS

PATENTED AUG 3 1971

INVENTORS
MARTTI J. MELA &
MARTTI S. SULONEN

BY
Lane, Aitken, Dunner + Ziems
ATTORNEYS

METHOD AND APPARATUS FOR LASER MICROANALYSIS

BACKGROUND OF THE INVENTION

Devices utilizing the stream of coherent light emitted by a laser to spectrographically analyze a sample are known. In such known prior art devices, however, certain required components such as electrodes for ionizing the sample and lenses for focusing laser light onto the sample are positioned in close proximity to the sample near the area where it is the target of the probe. Additionally, the teachings of the prior art indicate that the electrodes should be placed between the laser focusing lenses and the sample in order to affect a maximum increase of the ionization in the plasma of the sample.

Many problems are attendant with such prior art devices. Specifically, the location of the electrodes and the required high voltage for such electrodes prevents positioning the laser light focusing lenses close to the surface of the sample to be probed. The distance between the laser focusing lens system and the sample is significant when it is considered that it is desirable to analyze only a small area of the sample and the achievement of a small area for analysis is controlled by the numerical aperture of the focusing system.

It is known in the art that lens systems with large numerical apertures make small areas for analysis possible and that large numerical apertures result from small distances between the lens and the sample.

Moreover, with such prior art devices the location of the spectroscope in relation to the laser focusing system and electrodes detracts from the efficiency of the microanalysis device. Since the spectroscope is positioned on the same side of the sample as the laser focusing lenses and electrodes, both the lenses and electrodes interfere with radiation retrieval by obstructing a large part of the total radiation from the plasma, which radiation might otherwise reach the sample.

In order to increase the percentage of radiation being directed to the spectroscope, the prior art teaches that the sample being probed can be arranged with the plane of the face of the target in an oblique position relative to the stream of laser light. This arrangement significantly reduces the amount of interference produced by the obstructions in the system. However, the provision of such an oblique angle between the stream of laser light and the target plane results in an increase in the distance between the laser focusing lens system and the area of the sample which is the target of the probe. As explained above, this increase in distance is undesirable because such an increase in distance decreases the numerical aperture of the system.

SUMMARY OF THE INVENTION

The disadvantages of the prior art microprobe devices are significantly reduced by the microprobe apparatus of the instant invention, which apparatus is oriented so that the sample to be analyzed is positioned between the stream of laser light and the spectroscope. The sample is in the form of a thin foil with a thickness maintained such that the stream of laser light penetrates the foil. In order to enable more accurate focusing of the laser focusing lens and maintain a large numerical aperture, the electrodes are positioned adjacent the face of the foil opposite the direction of travel of the stream of laser light.

It is accordingly an object of the invention to provide an apparatus for spectrographic laser microprobe analysis wherein the laser focusing lenses and ionization electrodes do not obstruct radiation as such radiation travels from the sample to the spectroscope.

It is an additional object of the invention to provide a spectrographic laser microprobe analysis apparatus with a large numerical aperture.

It is a further object of the invention to provide a method of laser microprobe analysis wherein the stream of laser light penetrates the entire thickness of the sample.

DESCRIPTION OF THE PREFERRED EMBODIMENTS

Figure 1:
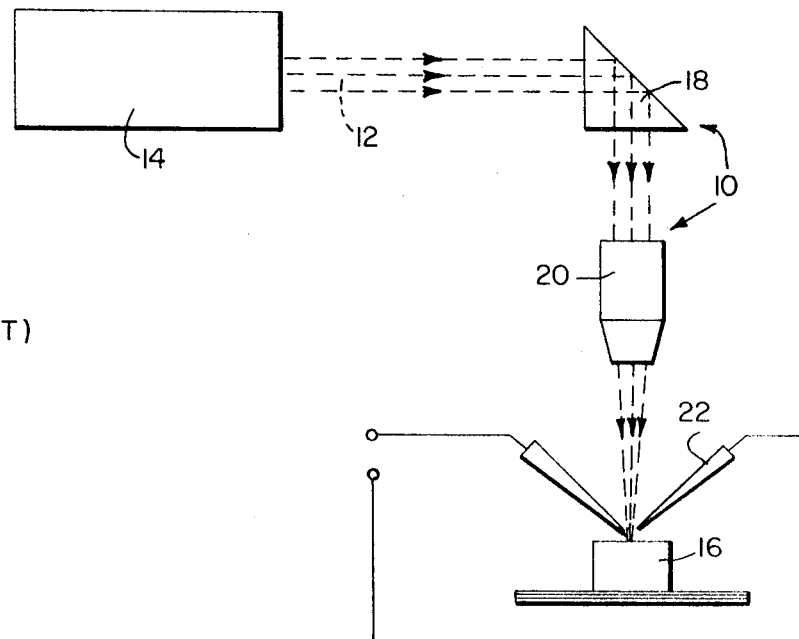
FIG. 1 is a schematic diagram illustrating the operation of prior art devices for spectrographic laser microanalysis.
Figure 2:
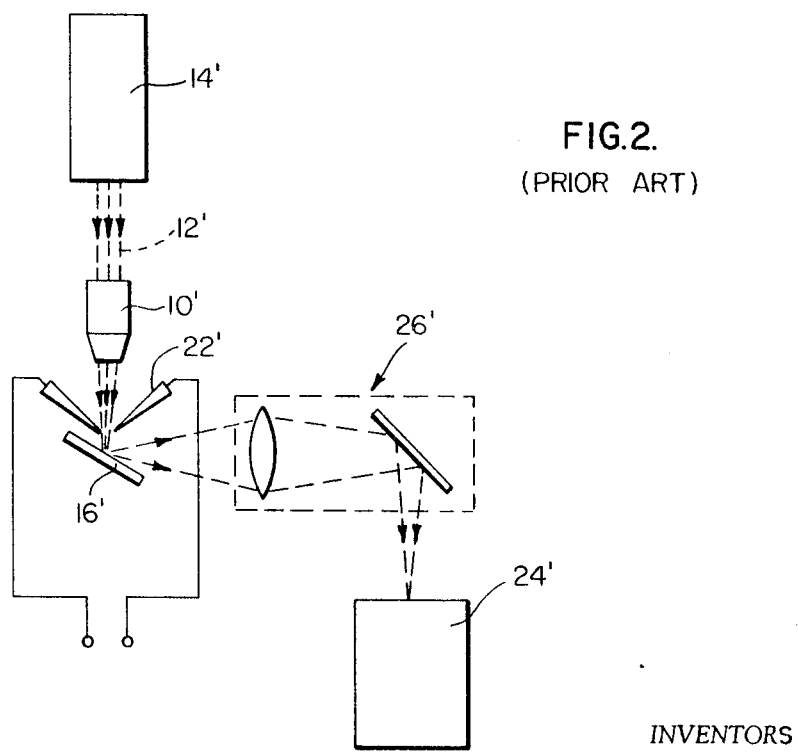
FIG. 2 is a schematic diagram similar to FIG. 1 but showing the operation of prior art devices with the face of the target of the sample at an oblique angle to the stream of laser light.
Figure 5:
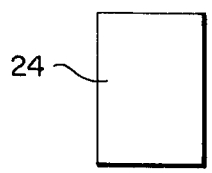
FIG. 5 is a diagram further illustrating the operation of the prior art device shown in FIG. 1.

Prior art devices for spectrographic microanalysis utilizing light energy emitted by a laser generator are shown in FIGS. 1, 2 and 5. Prior art devices for spectrographic analysis include optics 10, 10′, 10″ for focusing a stream of laser light 12, 12′, 12″ originating from a laser light generator 14, 14′ onto a sample or target 16, 16′, 16″. Collecting optics can include a prism 18 and an objective lens 20 (FIG. 1) or simply and objective lens (FIG. 2).

As is shown in FIGS. 1, 2 and 5, electrodes 22, 22′, 22″ are positioned between the collecting optics and the face of the sample which serves as a target for the probe. When in operation a high voltage is maintained between these electrodes in order to assist ionization which takes place in the plasma of the sample. Such prior art arrangements and techniques are described in H. Moenke's and L. Moenke's book entitled: "Einfuhrung in die Laser-Mikro-emissionspektralanalyse," Akademische Verlagsgesellschaft Geest Portig K.-G., Leipzig 1966, the teachings of which are incorporated herein by reference.

Attendant with such prior art devices are many problems. For example, the location of the electrodes and the high voltage present when such electrodes are utilized restrict accurate focusing of the stream of laser light on the face of the target. Moreover, the electrodes and focusing optics are obstacles in the path of radiation emitted by the plasma of the sample. Thus, as is shown in FIG. 5, there is only a small area where a spectroscope 24 and radiation collecting optics 26 can be placed and still receive the radiation that is emitted from the target.

In order to compensate for this problem and as is shown in FIG. 2, the prior art teaches that the sample 16′ can be placed at an oblique angle with reference to the stream of laser light 12′. This provides a larger area where radiation collecting optics 26′ can be placed and still be effective for directing such radiation onto a spectroscope 24′. A significant disadvantage of the apparatus shown in FIG. 2 is that in order to orient the face of the sample 16′ at an oblique angle to the stream of laser light 12′, it is necessary to increase the distance between collecting optics 10′ and the area of sample 16′ that serves as a target for the probe. As was explained above, such an increase in distance is significant and undesirable since it ultimately detracts from the achievement of the desired small area for analysis.

Figure 3:
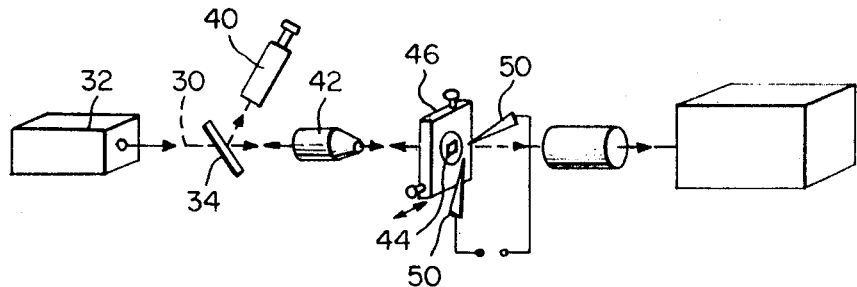
FIG. 3 is a schematic diagram illustrating the apparatus of the present invention.

The disadvantages of the prior art devices are significantly reduced by the apparatus of the present invention, which apparatus is shown in FIG. 3. In FIG. 3, a stream of laser light 30 is produced by laser light generator 32. As used throughout this specification and claims, the term laser light generator refers to any device, whether an amplifier or oscillator, which produces light energy by the stimulated emission of radiation. A beam splitter 34 is positioned in the path of travel of laser light stream 30. Said beam splitter provides a means for utilizing a viewer 40 in order to view the area of the sample to be analyzed. The beam splitter allows the passage of light in the direction of laser stream 30 but reflects light travelling in the opposite direction to viewer 40. Positioned on the optical axis of laser light stream 30 is a laser focusing lens 42 which focuses stream 30 onto the sample 44 to be analyzed. Sample 44 is secured in the path of stream 30 by an adjustable sample holder 46. Thus, through the use of viewer 40, lens 42, and adjustable holder 46, accurate adjustment so as to provide a small area for analysis is possible.

In accordance with the method and apparatus of the present invention, sample 44 is maintained in the form of a thin foil or a similar thin layer of other material. The thickness of the layer of foil or material is variable between approximately 2 and 200 millimicrons. The energy emitted by laser light generator 32 is selected so as to have a value between the ranges of approximately 0.1 to 10 joules and is selected so that the beam penetrates the foil (see FIG. 4).

Figure 4:
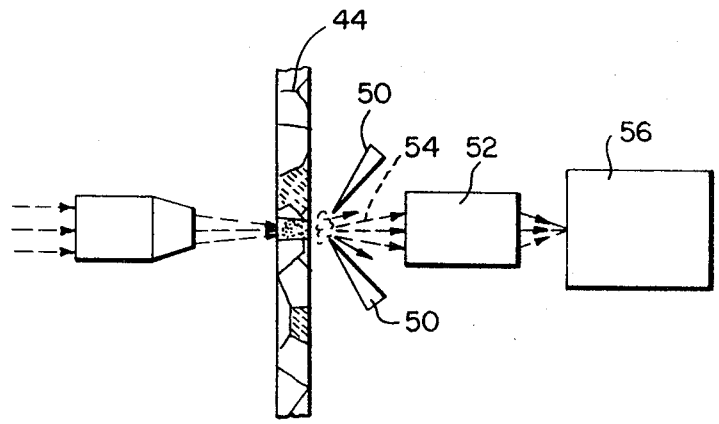
FIG. 4 is a diagram in accordance with the invention illustrating the advantages of providing a sample to be analyzed in the form of a thin foil.

As is shown in FIG. 4, the development of plasma in sample 44 is further ionized by electrodes 50. However, in accordance with the present invention the electrodes are positioned behind the sample with the front of the sample facing the stream of laser light. Since such laser light penetrates the entire thickness of the sample this arrangement is very efficient. Thus radiation collecting optics 52 can collect a large portion of radiation 54 from the plasma of the sample and direct such radiation onto a spectroscope 56. As is clearly shown in FIG. 4, the orientation of the electrodes in accordance with the present invention does not significantly obstruct radiation being emitted by the plasma.

As stated above, the sample to be analyzed is maintained in the form of a thin layer. Optimally the thickness corresponds to the diameter of one crystal of the substance to be analyzed. With samples having such a thickness, the operation of the probe is not effected by neighboring crystal areas. For example, FIG. 5 shows how crystals underneath the surface of a thick sample contribute to produce an uncertainty factor with regard to the analytical result. Since with such prior art arrangements the focused laser beam penetrates several grains, the microanalysis resulting therefrom represents the mean value of the analysis of several crystals.

FIG. 4 illustrates the advantages of the method of the present invention, which method utilizes a thin sample of approximately one crystal thickness By maintaining such a thin sample for analysis the results obtained represent a true microanalysis of a single crystal or area since the laser light is focused on only one crystal. Materials for analysis such as metals and minerals almost invariably have a grain structure which contributes to yield a mean value for analysis rather than a desired analysis of a single crystal. Materials such as metals and minerals, however, are easily formed into thin foils several microns in thickness which can be utilized in such form in accordance with the invention. The invention, however, is not restricted to the use of foils. Any material that can form a thin layer, such as powders and fluids absorbed into a porous matrix such as paper, will also produce operative results.

By providing a thin foil for analysis the spatial requirements of the components of the systems are improved. For example, in accordance with the invention, the electrodes can be positioned on the back side of the foil. It is to be understood that electrodes are not needed in all analyses. However, when required, positioning such electrodes behind the foil produces improved results such as more accurate focusing of the laser focusing lens system enabling a smaller sized area for analysis than is otherwise possible with any of the known prior art devices.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. In a microanalysis apparatus of the type wherein the radiation emitted by the plasma of a sample is analyzed by a spectroscope and wherein the plasma in the sample is developed by the combination of a stream of focused laser light and high voltage electrodes, the improvement comprising high voltage electrodes positioned on one side of the sample with the direction of travel of said stream of laser light first striking the side of the sample opposite the side where said high voltage electrodes are positioned.

2. A microanalysis apparatus comprising a laser light generator for producing a stream of laser light, focusing optics aligned with said stream of laser light, a sample to be analyzed positioned at the approximate focal point of said focusing optics, high voltage electrodes positioned on the backside of said sample opposite the side facing said focusing optics and a spectroscope optically aligned with the backside of said sample for analyzing the radiation from the plasma of said sample resulting from the application of laser light and high voltage to said sample.

3. The apparatus as set forth in claim 2 also including a beam splitter and a viewer, said beam splitter and viewer being optically oriented so that laser light reflecting from said sample passes through said laser light focusing optics and thereafter strikes said beam splitter and is reflected to said viewer.

4. The apparatus as set forth in claim 2 wherein said sample is a thin foil.

5. The apparatus as set forth in claim 4 wherein the thickness of the foil is between the range of approximately 2—200 millimicrons.

6. In a method of microanalysis of the type wherein radiation emitted by the plasma of a sample is analyzed by a spectroscope and wherein the plasma in the sample is developed by a combination of a stream of focused laser light and high voltage electrodes, the improvement comprising maintaining the thickness of the sample to be analyzed with dimensions such that the stream of focused laser light penetrates the entire thickness of the sample, positioning the spectroscope for analyzing the resulting radiation of the plasma of the sample so as to collect radiation from one side of the sample, said one side being the side opposite the side of the sample which the stream of laser light first strikes and positioning said high voltage electrodes on the side of the sample opposite the side of the sample which the stream of laser light first strikes.

7. The method as set froth in claim 6 including the step of maintaining the thickness of the sample between the range of approximately 2—200 millimicrons.